United States Patent
Kolomitsyna et al.

(10) Patent No.: US 11,091,715 B2
(45) Date of Patent: Aug. 17, 2021

(54) FUEL COMPOSITIONS BASED ON BINDERS FROM BIRCH BARK

(71) Applicant: REGENTS OF THE UNIVERSITY OF MINNESOTA, Minneapolis, MN (US)

(72) Inventors: Oksana Kolomitsyna, Duluth, MN (US); Matthew Young, Duluth, MN (US); Timothy Hagen, Superior, WI (US); Donald Fosnacht, Hermantown, MN (US); Eric Singsaas, Duluth, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 16/381,657

(22) Filed: Apr. 11, 2019

(65) Prior Publication Data

US 2019/0316052 A1    Oct. 17, 2019

Related U.S. Application Data

(60) Provisional application No. 62/656,076, filed on Apr. 11, 2018.

(51) Int. Cl.
*C10L 5/44* (2006.01)
*C10L 5/36* (2006.01)
(Continued)

(52) U.S. Cl.
CPC ............... *C10L 5/442* (2013.01); *C10L 5/146* (2013.01); *C10L 5/22* (2013.01); *C10L 5/361* (2013.01);
(Continued)

(58) Field of Classification Search
CPC .......... C10L 5/442; C10L 5/445; C10L 5/447; C10L 5/361; C10L 5/363; C10L 5/146;
(Continued)

(56) References Cited

U.S. PATENT DOCUMENTS

| 681,553 A | 8/1901 | Jacquot |
| 3,517,052 A * | 6/1970 | Brandts ............. C08G 16/0293 560/69 |

(Continued)

FOREIGN PATENT DOCUMENTS

| EP | 2842564 A1 | 3/2015 |
| RU | 2460741 C1 | 9/2012 |

(Continued)

OTHER PUBLICATIONS

Esteres et al, Adhesives from liquefied Eucalypt Bark and Branches, (2019), Wood Research, 64(1) 2019, pp. 105-116 (Year: 2019).*

(Continued)

*Primary Examiner* — Cephia D Toomer
(74) *Attorney, Agent, or Firm* — Billion & Armitage

(57) ABSTRACT

Embodiments of the present disclosure describe binder materials from birch bark, methods of making the binder materials, fuel compositions comprising the binder materials, methods of forming the fuel compositions in the form of pellets and/or briquettes, and the like.

8 Claims, 11 Drawing Sheets

(51) Int. Cl.
    *C10L 5/14*     (2006.01)
    *C10L 5/22*     (2006.01)

(52) U.S. Cl.
    CPC ............... *C10L 5/363* (2013.01); *C10L 5/445* (2013.01); *C10L 5/447* (2013.01); *C10L 2200/0209* (2013.01); *C10L 2200/0407* (2013.01); *C10L 2200/0469* (2013.01); *C10L 2290/24* (2013.01); *C10L 2290/30* (2013.01)

(58) Field of Classification Search
    CPC ............... C10L 5/22; C10L 2200/0209; C10L 2200/0469; C10L 2200/0407; C10L 2290/24; C10L 2290/30
    See application file for complete search history.

(56) References Cited

U.S. PATENT DOCUMENTS

| | | | |
|---|---|---|---|
| 4,981,494 | A | 1/1991 | Breuil et al. |
| 6,392,070 | B1 * | 5/2002 | Krasutsky ............... C07C 29/86 552/545 |
| 9,133,341 | B2 | 9/2015 | Steek et al. |
| 9,719,040 | B2 | 8/2017 | Morihara et al. |
| 9,963,600 | B2 * | 5/2018 | Holmbom ................ C09D 7/63 |
| 2005/0272892 | A1 | 12/2005 | Hse et al. |
| 2008/0262190 | A1 * | 10/2008 | Koskimies ............. C07C 67/03 528/271 |
| 2009/0182158 | A1 * | 7/2009 | Krasutsky ............ A61Q 17/005 552/510 |
| 2011/0302832 | A1 | 12/2011 | Arne |
| 2013/0091764 | A1 | 4/2013 | Wantling et al. |
| 2014/0199449 | A1 | 7/2014 | Hernandez |
| 2015/0203774 | A1 | 7/2015 | Lake |
| 2015/0245645 | A1 | 9/2015 | Raskin et al. |
| 2017/0049119 | A1 | 2/2017 | Perez et al. |
| 2018/0037768 | A1 | 2/2018 | Alcantar et al. |

FOREIGN PATENT DOCUMENTS

| | | |
|---|---|---|
| WO | 2007121482 A1 | 10/2007 |
| WO | 2010093320 A1 | 8/2010 |
| WO | 2013059325 A1 | 4/2013 |
| WO | 2014014910 A1 | 1/2014 |
| WO | 2014085762 A1 | 6/2014 |

OTHER PUBLICATIONS

Author unknown, Bark of Coniferous trees offer an option for glue raw materials, News from Finnish Forest and Forest Sector, Apr. 2018. (Year: 2018).*

Alakurtti, Sami, Adhesives from softwood bark tannins, VTT Sustainable binders from bark, 2017 (Year: 2017).*

Wilen, et al., "Wood torrefaction—pilot tests and utilisation prospects", Energy Research Centre of the Netherlands, VTT Technology, 2013, 1-80.

Kleinschmidt, "Overview of international developments in torrefaction", KEMA, Jan. 28, 2011, 1-16.

Wescott, et al., "High-soy-containing water-durable adhesives", Journal of Adhesion Science and Technology, 2006, 859-873.

White, et al., "Release of Bound Procyanidins from Cranberry Pomace by Alkaline Hydrolysis", American Chemical Society, Journal of Agricultural and Food Chemistry Article, 2010, 7572-7579.

Steven P. Crossley et al., "Novel Micropyrolyis Index (MPI) to Estimate the Sooting Tendency of Fuels," Energy & Fuels, 2008, 2455-2464.

Hoed, et al., "Berry Seeds: A Source of Specialty Oils With High Content of Bioactives and Nutritional Value," Department of Organic Chemistry, 2009, 33-49.

Wright, "Global demand for torrefied biomass could exceed 70 million tonnes a year by the end of the decade," Forest Business Network, Jan. 31, 2012, 1-2. https://www.forestbusinessnetwork.com/13392/global-demand-for-torrefied-biomass-could-exceed-70-million-tonnes-a-year-by-the-end-of-the-decade/.

Thran, et al., "Global Wood Pellet Industry and Trade Study," IEA Bioenergy, Jun. 2017, 1-243.

[Online]www.crsail.org, "Torrefied Biomass," Coalition for Sustainable Rail, Jan. 17, 2018, 1-5. https://csrail.org/torrefied-biomass/.

Ekman, "The Suberin Monomers and Triterpenoids from the Outer Bark of Betula verrucosa Ehrh", Holzforschung, vol. 37, 1983, pp. 205-211.

Heinamaki, et al., "Suberin Fatty Acids from Outer Birch Bark: Isolation and Physical Material Characterization", Journal of Natural Products, ACS Publications, vol. 80, 2017, pp. 916-924.

Hu, et al., "Effects of Binders on the Properties of Bio-Char Pellets", Applied Energy, 2015, pp. 508-516.

Kumar, et al., "Integrating Torrefaction in the Wood Pellet Industry: A Critical Review", Energy Fuels, 2017, pp. 37-54.

Peng, et al., "Sawdust as an Effective Binder for Making Torrefied Pellets", Applied Energy, 2015, pp. 491-498.

Peng, et al., "Study on Density, Hardness, and Moisture Uptake of Torrefied Wood Pellets", Energy & Fuels, vol. 27, 2013, pp. 967-974.

Penmetsa, et al., "Preliminary Findings for the Production of Water Repellent Torrefied Wood Pellets with Pyrolysis Oil", Environmental Progress & Sustainable Energy, vol. 31, Jul. 2012, pp. 235-239.

Toufiq, et al., "Engineered Pellets from Dry Torrefied and HTC Biochar Blends", Biomass and Bioenergy, vol. 63, 2014, pp. 229-238.

Toufiq, et al., "Pelletization of Biochar from Hydrothermally Carbonized Wood", Environmental Progress & Sustainable Energy, vol. 31, No. 2, Jul. 2012, pp. 225-234.

* cited by examiner

FUEL COMPOSITIONS BASED ON BINDERS FROM BIRCH BARK

BACKGROUND

In recent years, renewable energy sources have become increasingly more desirable and more important. To meet a growing energy demand, cellulose-containing materials have been pelletized and briquetted to provide a dense, relatively high-energy material. Desirable biomass materials in development include torrefied wood.

Torrefied wood is generally wood that has been heated in an absence of oxygen to remove water, organic volatiles, and a fraction of cellulose to produce a "blackened" wood chip. The torrefied wood chips can be easily formed into a high-energy, high-density pellets. However, when pellets are made from torrefied wood, most of the natural binders are burned off, producing pellets that suffer from poor water repellency. Due to these limitations, the pellets turn into a black "mud" upon exposure to water.

Another problem with torrefied wood pellets is durability. The pellets tend to create dust during mechanical processes needed to transport the pellets, such as loading and unloading of rail cars and ships. High dust fines tend to clump together, resulting in clinkering which reduces boiler efficiency due to incomplete combustion. In addition to product loss, the dust creates hazards, from inhalation, and the potential for dust explosions.

Conventional binder materials for energy pellets are limited to multi-component systems. Some binder materials, for example, are provided as two-component systems including a plasticizer and lignin. The lignin melts and flows like a binder material and assists with the pelletizing of biomass pellets. In these materials, the presence of lignin is a key factor to achieve biomass pelletizing success. However, these bio-mass pellets are neither waterproof, nor water repellant. Other multi-component systems combine lignin with other additives to improve water resistance-related properties. For example, one binder material includes a mixture of an alkaline protein hydrolysate and a bio-oil or an acidic protein hydrolysate and a lignin compound. Another binder material includes lignin, starch, calcium hydroxide, and sodium hydroxide.

Other multi-component systems may improve water resistance-related properties, but do not improve durability. For example, these binder materials contain a solubilized starch, a sugar source, and/or a diol or polyol compound and a polymer selected from polyvinyl alcohol (PVOH), PVOH copolymers, polyvinyl acetate (PVA), PVA copolymers, ethylene vinyl acetate, or any subset or combination of those polymers.

It therefore would be desirable to provide a one-component binder material for producing water-resistant and durable pellets and briquettes of torrefied wood and other fuel sources.

SUMMARY

In general, embodiments of the present disclosure describe novel binder materials from birch bark, methods of making the binder materials, fuel compositions comprising the binder materials, methods of forming the fuel compositions in the form of pellets and/or briquettes, and the like.

Embodiments of the present disclosure describe binder materials comprising fatty acids, fatty acids salts, fatty acids esters, sterols, and waxes.

Embodiments of the present disclosure describe methods of making binder materials from birch bark comprising contacting birch bark with an organic liquid solvent to obtain a first extract, wherein the first extract includes at least fatty acids and triterpenes; separating at least a portion of the triterpenes from at least the least fatty acids to obtain a second extract with a reduced concentration of triterpenes; contacting the second extract with a nonpolar solvent to obtain a third extract; and contacting the third extract with an alcohol alkali solution to obtain a binder material via alkali hydrolysis, wherein the binder material is free or substantially free of lignin and includes one or more of fatty acids, fatty acids salts, fatty acids esters, sterols, and waxes.

Embodiments of the present disclosure describe fuel compositions comprising pellets or briquettes of a fuel source, wherein the pellets or briquettes of the fuel source comprise: at least about 75% (w/w) fuel source; and at least about 2% to about 25% (w/w) binder material.

Embodiments of the present disclosure describe methods of making fuel compositions comprising mixing a binder material with a fuel source and water to form a mixture with a moisture content of about 20% or less, and compressing the mixture to form a fuel composition in the form of pellets or briquettes.

Embodiments of the present disclosure further describe methods of making fuel compositions comprising heating a binder material from birch bark to form a flowing binder material, mixing the flowing binder material with a fuel source and water to form a mixture, and physically processing the mixture to form pellets of the fuel source.

Embodiments of the present disclosure further describe methods of making fuel compositions comprising mixing a binder material form birch bark, fuel source, and water to form a mixture, treating the mixture to reduce a moisture content of the mixture and/or to increase a temperature of the mixture, and physically processing the mixture under pressure at a select temperature to form briquettes of the fuel source.

The details of one or more examples are set forth in the description below. Other features, objects, and advantages will be apparent from the description and from the claims.

BRIEF DESCRIPTION OF DRAWINGS

This written disclosure describes illustrative embodiments that are non-limiting and non-exhaustive. In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

Reference is made to illustrative embodiments that are depicted in the figures, in which.

DETAILED DESCRIPTION

Figure 1:
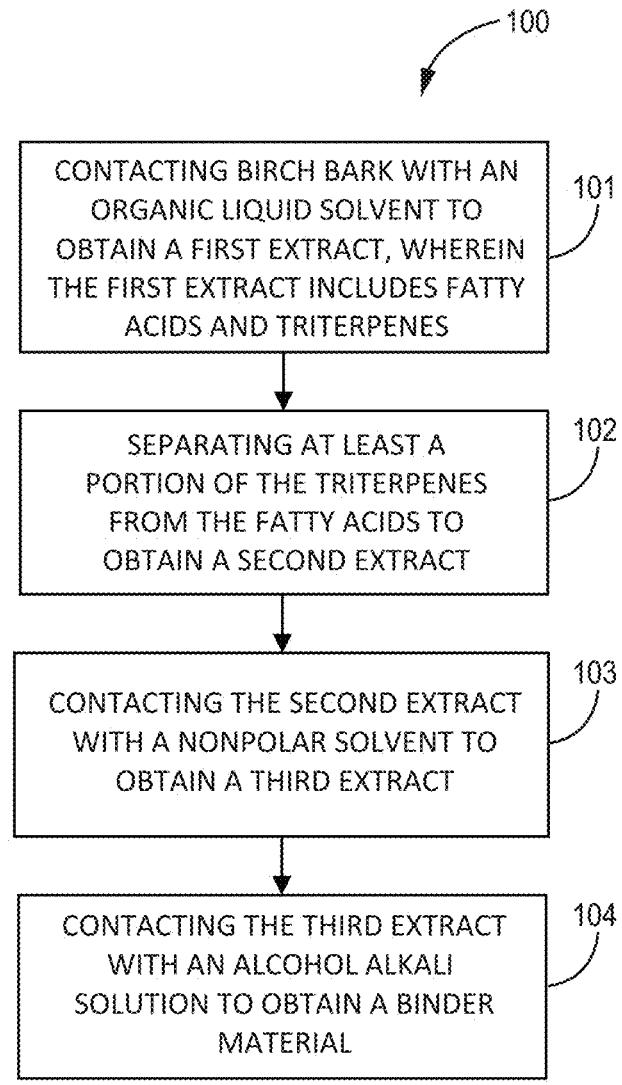
FIG. 1 is a flowchart of a method of making a binder material from birch bark, according to one or more embodiments of the present disclosure.

The present disclosure relates to novel biomass-based binder materials derived from birch bark and improved fuel compositions based on the binder materials. The binder materials generally comprise one or more of fatty acids, fatty acids salts, fatty acids esters, sterols, and waxes. The binder materials advantageously can be easily melted under certain conditions, such as elevated temperatures and/or pressures, to form a flowing binder material and cooled to reform the binder material as a solid. In this way, the flowing binder material can be combined with any of a wide variety of fuel sources and cooled to form a protective-like coating on the fuel source, resulting in unprecedented durable, water-resistant high energy-density pellets and/or briquettes. Unlike conventional materials, the binder materials are free or substantially free of, or at least have reduced concentrations of, plasticizers, lignin, polymers, bio-oil, other additives, triterpenes, and water-repelling agents.

Definitions

The terms recited below have been defined as described below. All other terms and phrases in this disclosure shall be construed according to their ordinary meaning as understood by one of skill in the art.

As used herein, the term "birch" refers to deciduous trees of the genus *Betula*. The birches comprise the family Betulaceae in the order Fagales. Birch trees include, for example, white birch, *B. alba*; sweet, black or cherry birch, *B. lenta*; monarch birch, *B. maximowicziana*; dwarf or arctic birch, *B. nana*; Japanese white birch, *B. platyphyla Japonica*; smooth-bark birch, *B. pubescens*; yellow birch, *B. alleghaniensis*; paper, white or canoe birch, *B. papyrifera*; grey birch, *B. populifolia*; river birch, *B. nigra*; and the European birches, *B. pubescens; B. Alba* and *B. pendula*. Specifically, birch can be *B. alba, B. lenta, B. maximowicziana, B. nana, B. platyphyla Japonica, B. pubescens, B. alleghaniensis, B. papyrifera, B. populifolia, B. nigra, B. pubescens, B. Alba* or *B. pendula*.

As used herein, the term "bark" refers to any outer covering of woody of plants. For example, the bark includes the outer covering of woody branches, stems, and roots of plants. The bark is usually separable from the woody plant and generally includes tissue outside the cambium. For example, the bark can include the growth layer between the bark and wood.

As used herein, the term "fatty acid" refers to carboxylic acids with aliphatic chains, which can be saturated or unsaturated. Where the aliphatic chain of the fatty acids is unsaturated, the term "fatty acids" includes cis and trans isomers thereof. For example, the fatty acids include cis and trans isomers of unsaturated fatty acids. The aliphatic chain or tail of the fatty acids can have one or more carbons, usually at least three or more carbons. In some embodiments, the term "fatty acids" is used generically to include, among others, fatty acids, fatty acids salts, fatty acids esters, etc.

As used herein, the term "fatty acids salts" refers to salts of fatty acids. In some embodiments, the fatty acids salts include salts of the formula: $RC(O)O^-X^+$, where R is a $C_{1+}$ (e.g., $C_{3+}$) aliphatic chain of the fatty acids and X is a counter-ion, or cation.

As used herein, "fatty acid ester" generally refers to an ester formed through the combination of a fatty acid and an alcohol. Fatty acid esters can generally be represented by the chemical formula: $RC(O)OR'$, wherein R is a carbon chain of a fatty acid and R' is an alkyl group of an alcohol. Examples of fatty acid esters include, but are not limited to, one or more of the following fatty acid esters: methyl hexanoate; methyl octanoate; methyl nonanoate; methyl decanoate; methyl undecanoate; methyl laurate; methyl tridecanoate; methyl myristate; methyl myristoleate; methyl pentadecanoate; methyl 10-pentadecenoate; methyl palmitate; methyl palmitoleate; methyl heptadecanoate; methyl 10-heptadecenoate; methyl stearate; trans-methyl elaidate; cis-methyl oleate; methyl linoleate; methyl gamma linolenate; methyl arachidate; methyl 11-eicosanoate; methyl 11,14-eicosadienoate; methyl methyl homogamma linolenate; methyl arachidonate; methyl 11,14,17-eicosatrienoate; methyl behenate; cis-methyl 5,8,11,14,17-eicosapentenoate; methylerucate; methyl 13,16-docosaidienoate; methyl lignocerate; cis-methyl 4,7,10,13,16,19-docosahexenoate; methyl nervonate; and cis and trans isomers thereof.

As used herein, the term "sterol" refers to compounds comprising three cyclohexane rings in a phenanthrene arrangement with a hydroxyl group at the C3 position, a terminal cyclopentane ring, and a C8-C10 side chains at the C17 position. The sterols can be substituted or unsubstituted, aromatic or non-aromatic, saturated or unsaturated.

As used herein, the term "wax" is generally used to refer to a group of compounds that contain long-chain fatty acids esterified with a fatty alcohol. The waxes are typically about 20 to about 44 carbons in length. In some instances, the waxes can be longer than 44 carbons in length and/or shorter than about 20 carbons in length. In addition, the waxes are typically characterized by a melting point of at least about 40° C. Examples of waxes include, but are not limited to, very long-chain fatty acids, alkanes, primary and/or secondary alcohols, aldehydes, ketones, esters, and flavonoids.

As used herein, the term "lignin" generally refers to organic polymers present in birch bark. The lignin usually provides the characteristics of woody and rigidity. The organic polymers include organic polymers comprising alcohols, such as phenolic polymers. The term "lignin" includes solid polymeric lignin, as well as partially and/or fully dissolved lignin.

As used herein, the term "triterpene" refers to a class of compounds having approximately 30 carbon atoms and synthesized from six isoprene units in plants and other organisms. Triterpenes consist of carbon, hydrogen, and optionally oxygen. Most triterpenes are secondary metabolites in plants. Most, but not all, triterpenes are pentacyclic. Examples of triterpenes include, but are not limited to, betulin, allobetulin, lupeol, friedelin, and all sterols, including lanosterol, stigmasterol, cholesterol, sitosterol, and ergosterol, among others.

As used herein, the term "betulin" refers to 3β,28-dihydroxylup-20(29)-ene. Betulin is a pentacyclic triterpenoid found in the outer bark of paper birch trees (*Betula papyrifera, B. pendula*, etc.). It is known to be present at concentrations of up to about 24% of the bark of the white birch. Merck Index, twelfth edition, page 1236 (1996). Structurally, betulin is shown below:

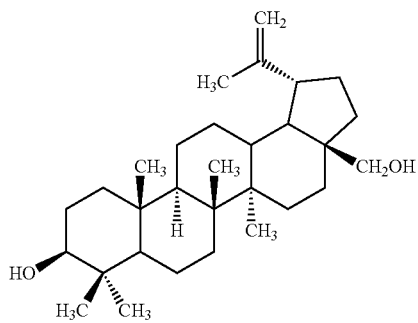

As used herein, the term "betulinic acid" refers to 3β-hydroxylup-20(29)-en-28-oic acid. Structurally, betulinic acid is shown below:

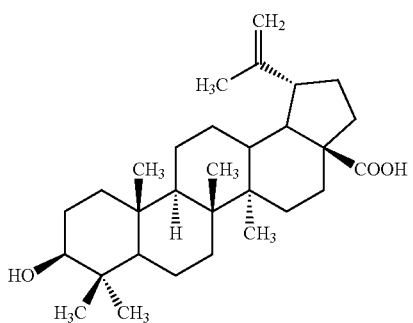

As used herein, the term "lupeol" refers to lup-20(29)-en-3β-ol. Lupeol is also found in birch bark and in other plant sources. Lupeol is present at concentrations of about 1.5-3% of the birch bark and at up to about 8.2% in *Canavalia ensiformis*, a plant widespread in the humid tropics of Asia and Africa. Structurally, lupeol is shown below:

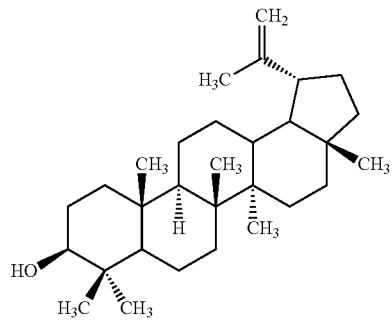

As used herein, the term "free" refers to a concentration of a species that includes trace amounts or less. In some embodiments, the term "free" refers to a concentration of a species that is about 1% or less, about 0.9% or less, about 0.8% or less, about 0.7% or less, about 0.6% or less, about 0.5% or less, about 0.4% or less, about 0.3% or less, about 0.2% or less, about 0.1% or less, or about 0.01% or less. As used herein, the term "substantially free" refers to a concentration of a species that is more than trace amounts. For example, in some embodiments, the term "substantially free" refers to a concentration of a species that is about 3% or less or about 2% or less.

As used herein, "contacting" refers to the act of touching, making contact, or of bringing to close or immediate proximity, including at the cellular or molecular level, for example, to bring about a physiological reaction, a chemical reaction, or a physical change (e.g., in solution, in a reaction mixture, in vitro, or in vivo). Contacting may refer to bringing two or more components in proximity, such as physically, chemically, electrically, or some combination thereof. Mixing is an example of contacting.

As used herein, "heating" refers to increasing to or at a temperature.

As used herein, "mixing" refers to contacting two or more components. For example, "mixing" may refer to bringing two or more components into physical contact, or immediate or close proximity.

As used herein, "physically processing" refers to applying one or more of pressure and temperature to form one or more of pellets and briquettes.

As used herein, "separating" refers to removing at least one component from one or more other components.

Binder Materials

Embodiments of the present disclosure describe binder materials derived from birch bark comprising one or more of fatty acids, fatty acids salts, fatty acids esters, sterols, and waxes. In some embodiments, the binder materials from birch bark comprise fatty acids, fatty acids salts, fatty acids esters, sterols, and waxes.

In some embodiments, the fatty acids, fatty acids salts, and fatty acids esters are not particularly limited and include any fatty acids, fatty acids salts, and fatty acids esters produced according to the methods described herein from species naturally present in any of the birch barks. In some embodiments, the fatty acids include $C_{3+}$ fatty acids. In some embodiments, the fatty acids salts have counter-ions from the alkali used in alkali hydrolysis as described in more detail below. For example, in some embodiments, the sodium is the counter-ion.

In some embodiments, the fatty acids esters include fatty acids methyl esters, among other fatty acids esters. For example, in some embodiments, the fatty acids esters include one or more of: methyl hexanoate; methyl octanoate; methyl nonanoate; methyl decanoate; methyl undecanoate; methyl laurate; methyl tridecanoate; methyl myristate; methyl myristoleate; methyl pentadecanoate; methyl 10-pentadecenoate; methyl palmitate; methyl palmitoleate; methyl heptadecanoate; methyl 10-heptadecenoate; methyl stearate; trans-methyl elaidate; cis-methyl oleate; methyl linoleate; methyl gamma linolenate; methyl arachidate; methyl 11-eicosanoate; methyl 11,14-eicosadienoate; methyl methyl homogamma linolenate; methyl arachidonate; methyl 11,14,17-eicosatrienoate; methyl behenate; cis-methyl 5,8,11,14,17-eicosapentenoate; methyl erucate; methyl 13,16-docosaidienoate; methyl lignocerate; cis-methyl 4,7,10,13,16,19-docosahexenoate; methyl nervonate; and cis and trans isomers thereof.

In some embodiments, the sterols include sitosterol. In some embodiments, the sterols include schottenol. In some embodiments, the sterols include sitosterol and schottenol. In some embodiments, the sterols include or further include one or more other sterols.

In some embodiments, the waxes include one or more of octacosanol, glycerol, methyl palmitate, methyl linoleate, methyl oleate, and methyl hexacosanoate. In some embodiments, the waxes include or further include one or more other waxes.

In some embodiments, the binder materials further comprise about 15% or less of triterpenes, or any increment thereof. In some embodiments, the binder materials further comprise about 15% or less, about 14% or less, about 13% or less, about 12% or less, about 11% or less, about 10% or less, about 9% or less, about 8% or less, about 7% or less, about 6% or less, about 5% or less, about 4% or less, about 3% or less, about 2% or less, or about 1% or less of triterpenes. In other embodiments, the binder materials further comprise about 0.1% to about 15% triterpenes, or any increment thereof. For example, in some embodiments, the binder materials further comprise about 10% to about 15% triterpenes. In some embodiments, the binder materials comprise about 5% to about 10% triterpenes.

In some embodiments, the triterpenes include betulin. In some embodiments, the triterpenes include betulinic acid. In some embodiments, the triterpenes include lupeol. In some embodiments, the triterpenes include oleanolic acid. In some embodiments, the triterpenes include ursolic acid. In some embodiments, the triterpenes include one or more of betulin, betulinic acid, lupeol, oleanolic acid, and ursolic acid. In some embodiments, the triterpenes comprise other triterpenes or further comprise other triterpenes.

In some embodiments, the binder material is characterized as water-resistant. In some embodiments, the binder material is durable. In some embodiments, the binder material flows at temperatures of about 60° C. or greater. In some embodiments, the binder material is a solid or solid-like at temperatures less than about 60° C.

Methods of Making Binder Materials

FIG. 1 is a flowchart of a method 100 of making a binder material from outer birch bark, according to one or more embodiments of the present disclosure. As shown in FIG. 1, the method comprises one or more of the following steps: contacting 101 birch bark with an organic liquid solvent to obtain a first extract, wherein the first extract includes at least fatty acids and triterpenes; separating 102 at least a portion of the triterpenes from at least the least fatty acids to obtain a second extract with a reduced concentration of triterpenes; contacting 103 the second extract with a non-polar solvent to obtain a third extract; and contacting 104 the third extract with an alcohol alkali solution to obtain a binder material via alkali hydrolysis, wherein the binder material is free or substantially free of lignin and includes one or more of fatty acids, fatty acids salts, fatty acids esters, sterols, and waxes.

The 101 includes contacting birch bark with an organic liquid solvent to obtain a first extract, wherein the first extract includes at least fatty acids and triterpenes. In some embodiments, the contacting includes washing. For example, in some embodiments, the contacting includes washing the birch bark with a liquid solvent to obtain the first extract. In some embodiments, the first extract is obtained by solid-liquid extraction from the birch bark. In some embodiments, the contacting proceeds at or to a temperature in the range of about 50° C. to about 150° C., or any increment thereof. In some embodiments, the contacting proceeds at or to a temperature in the range of about 60° C. to about 83° C., or any increment thereof. In some embodiments, the contacting proceeds for a duration of about 1 h to about 4 h. In some embodiments, the contacting proceeds for a duration less than about 1 h and/or greater than about 4 h.

In some embodiments, the birch bark is obtained from trees selected from: white birch, *B. alba*; sweet, black or cherry birch, *B. lenta*; monarch birch, *B. maximowicziana*; dwarf or arctic birch, *B. nana*; Japanese white birch, *B. platyphyla Japonica*; smooth-bark birch, *B. pubescens*; yellow birch, *B. alleghaniensis*; paper, white or canoe birch, *B. papyrifera*; grey birch, *B. populifolia*; river birch, *B. nigra*; and the European birches, *B. pubescens; B. Alba* and *B. pendula*. In some embodiments, the birch bark is obtained from: *B. alba, B. lenta, B. maximowicziana, B. nana, B. platyphyla Japonica, B. pubescens, B. alleghaniensis, B. papyrifera, B. populifolia, B. nigra, B. pubescens, B. Alba, B. pendula*, and combinations thereof.

In some embodiments, the organic liquid solvent is selected from any organic solvent. For example, in some embodiments, the organic liquid solvent is selected from methanol, ethanol, propanol, acetone, chloroform, dichloromethane, xylenes, o-dichlorobenzene (ODCB), dimethylsulfoxide (DMSO), tetrahydrofuran (THF), ethyl acetate, benzene, dimethylformamide (DMF), any derivatives thereof, and any combinations thereof. In some embodiments, the organic liquid solvent is non-polar. In some embodiments, the organic liquid solvent is polar. In some embodiments, the organic liquid solvent includes oxygenated hydrocarbons. In some embodiments, the organic liquid solvents have one or more of the following characteristics: straight-chained, branched, cyclic, and aromatic. Examples of organic solvents include, but are not limited to, one or more of alcohols, aldehydes, ketones, esters, and ethers. For example, in some embodiments, the alcohols are selected from methanol, ethanol, 2-propanol, n-propanol, isopropanol, butanol, pentanol, hexanol, cyclohexanol, benzyl alcohol, and decanol. In some embodiments, the aldehydes are selected from formaldehyde, acetaldehyde, and benzaldehyde. In some embodiments, the ketones are selected from acetone, methyl ethyl ketone, methyl phenyl ketone, and diethyl ketone. In some embodiments, the esters are selected from ethyl acetate, methyl isobutyrate, and 2-ethylhexyl acrylate. In some embodiments, the ethers are selected from diethyl ether, dioxane, tetrahydrofuran, chloroform, and dichloromethane.

In some embodiments, a proportion of the birch bark/liquid solvent is in the range of about 1/1 to about 1/25 by weight/volume (w/v), or any increment thereof. For example, in some embodiments, a proportion of the birch bark/liquid solvent is in the range of about 1/4 to about 1/10 (w/v). In some embodiments, a proportion of the birch bark/liquid solvent is about 1/4 (w/v). In some embodiments, a proportion of the birch bark/liquid solvent is about 1/5 (w/v). In some embodiments, a proportion of the birch bark/liquid solvent is about 1/6 (w/v). In some embodiments, a proportion of the birch bark/liquid solvent is about 1/7 (w/v). In some embodiments, a proportion of the birch bark/liquid solvent is about 1/8 (w/v). In some embodiments, a proportion of the birch bark/liquid solvent is about 1/9 (w/v). In some embodiments, a proportion of the birch bark/liquid solvent is about 1/10 (w/v).

In some embodiments (not shown), the first extract may be separated from residual components, such as residual organic liquid solvent, spent birch bark (e.g., birch bark that has been contacted with the organic liquid solvent), and other liquids and/or solvents involved in or remaining from the contacting. For example, in some embodiments, the separating includes hot filtration, evaporation, or combinations thereof. For example, in some embodiments, the separating includes hot filtration. In some embodiments, the hot filtration separates the first extract from at least the spent birch bark. In some embodiments, the separating includes vacuum evaporation at or to a temperature of about 60° C. or less. In some embodiments, vacuum evaporation is used to remove any residual organic liquid solvent. In other embodiments, other techniques known in the art suitable for separating and/or removing residual components are used herein.

In some embodiments, the separating is sufficient to obtain a first extract volume in the range of about 5% to about 50% of the volume of the initial mash. In some embodiments, the separating obtains a first extract volume in the range of about 15% to about 35% of the volume of the initial mash. In some embodiments, the separating obtains a first extract volume in the range of about 15% to about 30% of the volume of the initial mash. In some embodiments, the separating obtains a first extract volume in the range of about 20% to about 35% of the volume of the initial mash. In some embodiments, the separating obtains a first extract volume in the range of about 20% to about 30% of the volume of the initial mash.

The step 102 includes separating at least a portion of the triterpenes from at least the least fatty acids to obtain a second extract with a reduced concentration of triterpenes. In some embodiments, the separating includes contacting or washing with an organic solvent. In some embodiments, the separating includes precipitating. In some embodiments, the separating is a process in which the first extract is fractioned by crystallization with an organic solvent. The organic solvent can include any of the organic solvents of the present disclosure. For example, in some embodiments, the organic solvent is 2-propanol.

In some embodiments, the separating is used to form or precipitate crystals. In some embodiments, the crystals include all or at least a portion of the triterpenes present in first extract. In some embodiments, the triterpenes include betulin, betulinic acid, and lupeol. In some embodiments, the triterpenes include or further include other triterpenes. In some embodiments, the crystals are filtered and the organic solvent is removed from the second extract (or, in some instances, the crystals) by evaporation, or both. In some embodiments, the evaporation is vacuum evaporation that proceeds at or to a temperature of about 60° C. or less to obtain a second extract. In some embodiments, the second extract volume is in the range of about 20% to about 35% of the volume of the first extract.

In some embodiments, a proportion of the first extract/organic solvent is in the range of between about 1/5 to about 1/15 (w/v), or any increment thereof. For example, in some embodiments, a proportion of the first extract/organic solvent is about 1/5 (w/v). In some embodiments, a proportion of the first extract/organic solvent is about 1/6 (w/v). In some embodiments, a proportion of the first extract/organic solvent is about 1/7 (w/v). In some embodiments, a proportion of the first extract/organic solvent is about 1/8 (w/v). In some embodiments, a proportion of the first extract/organic solvent is about 1/9 (w/v). In some embodiments, a proportion of the first extract/organic solvent is about 1/10 (w/v). In some embodiments, a proportion of the first extract/organic solvent is about 1/11 (w/v). In some embodiments, a proportion of the first extract/organic solvent is about 1/12 (w/v). In some embodiments, a proportion of the first extract/organic solvent is about 1/13 (w/v). In some embodiments, a proportion of the first extract/organic solvent is about 1/14 (w/v). In some embodiments, a proportion of the first extract/organic solvent is about 1/15 (w/v).

In some embodiments, the second extract has a reduced concentration of triterpenes. For example, in some embodiments, the second extract includes about 15% or less of triterpenes. In some embodiments, the second extract includes about 15% or less, about 14% or less, about 13% or less, about 12% or less, about 11% or less, about 10% or less, about 9% or less, about 8% or less, about 7% or less, about 6% or less, about 5% or less, about 4% or less, about 3% or less, about 2% or less, about 1% or less, or about 0% of triterpenes. In some embodiments, the second extract is substantially free of triterpenes. In some embodiments, the second extract is free of triterpenes.

The step 103 includes contacting the second extract with a nonpolar solvent to obtain a third extract. In some embodiments, the contacting includes extracting. In some embodiments, the second extract is washed with a nonpolar organic solvent. Any nonpolar solvents of the present disclosure and/or known in the art may be used herein. For example, in some embodiments, the second extract is washed with hexane. In some embodiments, the contacting proceeds at or to a temperature in the range of about 50° C. to about 68° C. In some embodiments, the contacting proceeds for a duration sufficient to obtain the third extract. For example, in embodiments in which the nonpolar solvent is hexane, the contacting proceeds for a duration of about 1 h to about 2 h. In some embodiments, the contacting further includes clarification by filtration at temperatures in the range of about 35° C. or less. In some embodiments, the contacting further includes concentrating the clarified by vacuum evaporation of the solvent at a temperature of about 60° C. or less. In some embodiments, the third extract obtained is a yellowish colored birch "honey" with a volume in the range of about 20% to about 30% of the volume of the second extract.

In some embodiments, a proportion of second extract/nonpolar solvent is in the range of about 1/6 to about 1/15 by (w/v). In some embodiments, a proportion of the second extract/nonpolar solvent is about 1/6 (w/v). In some embodiments, a proportion of the second extract/nonpolar solvent is about 1/7 (w/v). In some embodiments, a proportion of the second extract/nonpolar solvent is about 1/8 (w/v). In some embodiments, a proportion of the second extract/nonpolar solvent is about 1/9 (w/v). In some embodiments, a proportion of the second extract/nonpolar solvent is about 1/10

(w/v). In some embodiments, a proportion of the second extract/nonpolar solvent is about 1/11 (w/v). In some embodiments, a proportion of the second extract/nonpolar solvent is about 1/12 (w/v). In some embodiments, a proportion of the second extract/nonpolar solvent is about 1/13 (w/v). In some embodiments, a proportion of the second extract/nonpolar solvent is about 1/14 (w/v). In some embodiments, a proportion of the second extract/nonpolar solvent is about 1/15 (w/v).

The step 104 includes contacting the third extract with an alkali solution or alcohol alkali solution to obtain a binder material. In some embodiments, the binder material is obtained by alkali hydrolysis. In some embodiments, the contacting of the third extract with the alkali solution is used to modify the birch "honey" of the third extract and obtain the binder material. In some embodiments, the contacting proceeds at or to a temperature in the range of about 50° C. to about 90° C. In some embodiments, the contacting proceeds for any duration sufficient for alkali hydrolysis. For example, in some embodiments, the contacting proceeds for about 1 h. In some embodiments, the alkali solution includes NaOH. In some embodiments, the alkali solution includes an organic solvent. In some embodiments, the organic solvent is a polar organic solvent. In some embodiments, the organic solvent is methanol, or any other alcohol. In some embodiments, the alkali solution includes or further includes water. In some embodiments, the alkali solution includes NaOH in a polar organic solvent, optionally further including water.

In some embodiments, the birch "honey" is modified by alkali hydrolysis to obtain the binder material. In some embodiments, the binder material obtained is a mixture of one or more fatty acids, fatty acids salts, fatty acids esters, sterols, and waxes. In some embodiments, the binder material is free of lignin. In some embodiments, the binder material is substantially free of lignin. In some embodiments, the binder material includes a reduced concentration of lignin. In some embodiments, the binder material is characterized in that it has a brown color, such as a dark brown. In some embodiments, the binder material is viscous at temperatures above about 60° C. In some embodiments, the binder material is solid and/or brittle at about room temperature. In some embodiments, the binder material is easily be grinded.

Fuel Compositions

Embodiments of the present disclosure describe fuel compositions. In some embodiments, the fuel compositions comprise pellets or briquettes of a fuel source, wherein the pellets or briquettes of the fuel source comprise: at least about 75% (w/w) fuel source; and at least about 2% to about 25% (w/w) binder material. Any of the binder materials of the present disclosure can be used herein. For example, in some embodiments, the binder material is a mixture comprising one or more of fatty acids, fatty acids salts, fatty acids esters, sterols, and waxes. In some embodiments, the fuel composition is water-resistant. In some embodiments, the fuel composition is durable. In some embodiments, the fuel composition is water-resistant and durable.

In some embodiments, the fuel source is selected from biomasses, minerals and/or fertilizer agglomerate bindings, carbonized materials, and combinations thereof. In some embodiments, the biomasses are selected from white woods, agricultural waste streams, grasses, bagasse waste, forest and/or logging residues, and barks. Examples of white woods include, but are not limited to, softwoods and hardwoods. Examples of agricultural waste streams include, but are not limited to, straws, stovers, etc. In certain embodiments, the fuel source is torrefied wood. In some embodiments, the minerals and/or fertilizer agglomerate bindings include gypsum. In some embodiments, the carbonized materials are selected from torrefied woods, bio chars, activated carbons and granulized carbon powders from hydrothermal carbonizations. These are provided as examples and thus shall not be limiting as other fuel sources may be used herein without departing from the scope of the present disclosure.

Methods of Making Fuel Compositions

Figure 2:
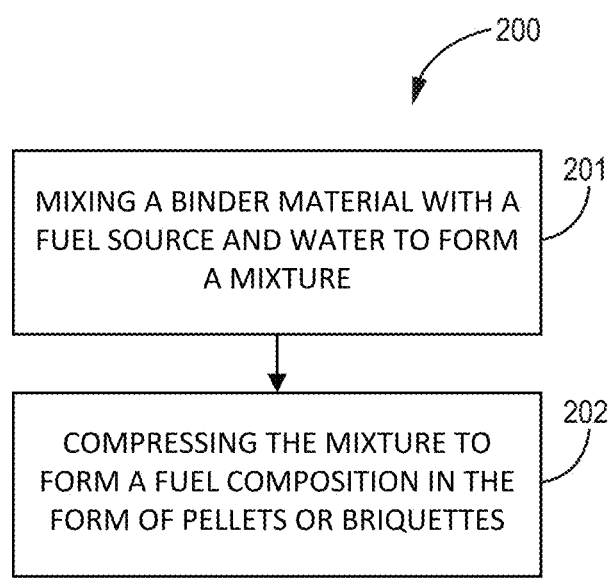
FIG. 2 is a flowchart of a method of making a fuel composition, according to one or more embodiments of the present disclosure.

FIG. 2 is a flowchart of a method of making a fuel composition, according to one or more embodiments of the present disclosure. As shown in FIG. 2, the method comprises one or more of the following steps: mixing 201 a binder material with a fuel source and water to form a mixture with a moisture content of about 20% or less, and compressing 202 the mixture to form a fuel composition in the form of pellets or briquettes.

The step 201 includes mixing a binder material with a fuel source and water to form a mixture with a moisture content of about 20% or less. The binder materials of the present disclosure may be used herein. For example, in some embodiments, the binder materials are binder materials from birch bark. In some embodiments, the binder materials include a mixture of fatty acids, fatty acids salts, fatty acids esters, sterols, and waxes. In some embodiments, the binder materials include fatty acids, fatty acids salts, fatty acids esters, sterols, waxes, and about 15% or less of triterpenes.

In some embodiments, the fuel source is selected from biomasses, minerals and/or fertilizer agglomerate bindings, carbonized materials, and combinations thereof. In some embodiments, the biomasses are selected from white woods, agricultural waste streams, grasses, bagasse waste, forest and/or logging residues, and barks. Examples of white woods include, but are not limited to, softwoods and hardwoods. Examples of agricultural waste streams include, but are not limited to, straws, stovers, etc. In certain embodiments, the fuel source is torrefied wood. In some embodiments, the minerals and/or fertilizer agglomerate bindings include gypsum. In some embodiments, the carbonized materials are selected from torrefied woods, bio chars, activated carbons and granulized carbon powders from hydrothermal carbonizations. These are provided as examples and thus shall not be limiting as other fuel sources may be used herein without departing from the scope of the present disclosure.

In some embodiments, the mixture of the binder material, fuel source, and water has a moisture content of about 20% or less. For example, in some embodiments, the mixture has a moisture content of about 15% or less. In some embodiments, the mixture has a moisture content of about 10% or less. In other embodiments, the mixture has a moisture content in the range of about 1% to about 25%, or any increment thereof. For example, in some embodiments, the mixture has a moisture content in the range of about 15% to about 25%. In some embodiments, the mixture has a moisture content in the range of about 10% to about 20%. In some embodiments, the mixture has a moisture content in the range of about 10% to about 15%. In some embodiments, the mixture has a moisture content in the range of about 5% to about 20%. In some embodiments, the mixture has a moisture content in the range of about 5% to about 15%. In some embodiments, the mixture has a moisture content in the range of about 5% to about 10%. In some embodiments, the mixture has a moisture content in the range of about 5% to about 25%.

The step 202 includes compressing the mixture to form a fuel composition, wherein the fuel composition includes pellets of the fuel source or briquettes of the fuel source. In some embodiments, the compressing comprises extruding or pressing the mixture through a die to form pellets of the fuel source. In some embodiments, the compressing comprises mixing at or to a select temperature and pressure. In some embodiments, the select temperature is in the range of about 10° C. to about 50° C., or any increment thereof. For example, in some embodiments, the select temperature is less than about 35° C. In some embodiments, the select temperature is in the range of about 20° C. to about 25° C. In some embodiments, the select temperature is in the range of about 20° C. to about 22° C. In some embodiments, the select temperature is at least about 200° C. For example, in some embodiments, the select temperature is about 260° C. or greater. In some embodiments, the select pressure is in the range of about atmospheric pressure to about 30,000 psi, or any increment thereof. In some embodiments, the select pressure is in the range of about 10,000 psi to about 20,000 psi. In some embodiments, the select pressure is in the range of about 14,000 psi to about 16,000 psi. In some embodiments, the select pressure is about 14,700 psi (e.g., 14,793 psi).

In some embodiments, the compressing is used to form a flowing binder material. For example, in some embodiments, the select temperature, select pressure, or a combination of the select temperature and select pressure are suitable to reduce a viscosity of the binder material such that the binder material melts to form a flowing binder material. In other embodiments, the binder material is optionally heated prior to the mixing to reduce a viscosity of the binder material and form a flowing binder material. For example, in some embodiments, the binder material is heated to at least about 60° C. or higher.

In some embodiments, a flowing binder material allows the binder material to coat or cover the fuel source during the compressing at the select temperature and/or select pressure. In some embodiments, by heating the binder material prior to the mixing, a flowing binder material can be mixed with the fuel source and water to coat or cover the fuel source. In some embodiments, after the compressing, the binder material is cooled such that it reforms as a solid coating that covers all or at least a portion of the fuel source.

Figure 3:
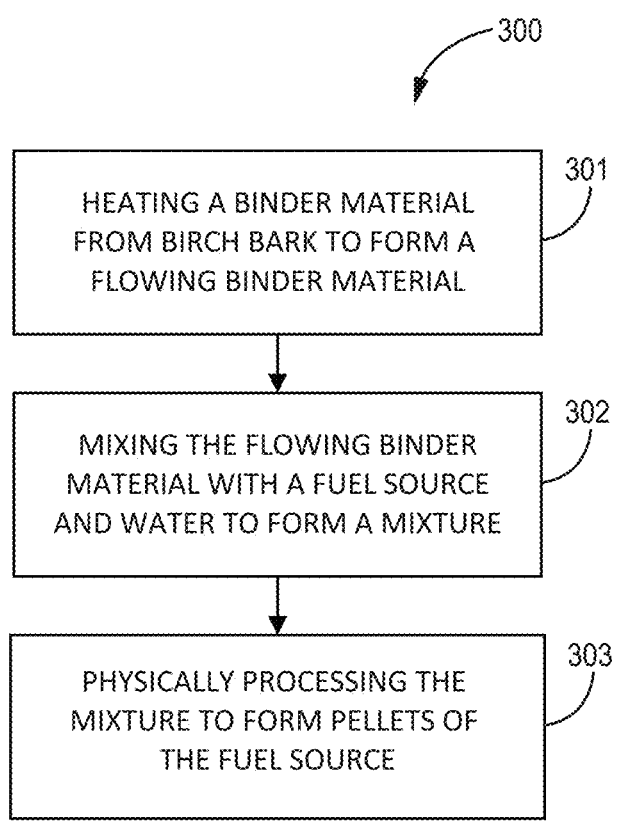
FIG. 3 is a flowchart of a method of forming pellets of torrefied wood, according to one or more embodiments of the present disclosure.

In certain embodiments, the methods described above are used to pelletize the fuel source, or a pelletized fuel source. For example, FIG. 3 is a flowchart of a method of forming pellets of a fuel source, according to one or more embodiments of the present disclosure. As shown in FIG. 3, the method may comprise heating 301 a binder material from birch bark to form a flowing binder material, mixing 302 the flowing binder material with a fuel source and water to form a mixture, and physically processing 303 the mixture to form pellets of the fuel source.

The step 301 includes heating a binder material from birch bark sufficient to form a flowing binder material. In some embodiments, the binder material is heated at or to a temperature sufficient for a viscosity of the binder material to be reduced. In some embodiments, as the viscosity of the binder material is reduced, the binder material melts sufficient for the binder material or at least a portion of the binder material to flow such that it is capable of being poured (e.g., poured in with the fuel source). In some embodiments, a hot plate is used to heat the binder material. In other embodiments, the binder material is heated using other than a hot plate, such as industrial-scale heating equipment, without departing from the principles of the present invention.

The step of 302 includes mixing the flowing binder material with the fuel source and water to form a mixture with a desired moisture content. In some embodiments, the mixing includes various forms of contacting, such as pouring and adding. For example, in some embodiments, the flowing binder material from step 301 is poured in with a mixture of the fuel source and water. In some embodiments, the fuel source and water are contacted to form a mixture and subsequently the flowing binder material is poured in with the mixture. In some embodiments, upon the contacting and/or pouring of the binder material, the mixture of binder material, fuel source, and water is mixed or immediately mixed. In some embodiments, a Hobart machine or other suitable devices known in the art are used for the mixing.

In some embodiments, the mixture includes about 2% to about 20% binder material, and about 80% to about 98% fuel source. In some embodiments, the mixture includes about 10% binder material and about 90% fuel source. In some embodiments, water is added to form a mixture with the desired moisture content. For example, in some embodiments, the amount of water added to the mixture includes an amount sufficient to provide a mixture, before pelletizing, with a moisture content in the range of about 5% to about 25%. For example, in some embodiments, the moisture content is about 10% (e.g., on a wet basis).

The step of 303 includes physically processing the mixture to form pellets of the fuel source. In some embodiments, the physically processing proceeds at elevated temperatures and/or pressures. In some embodiments, the physically processing includes compressing. For example, in some embodiments, the physically processing includes extruding or pressing the mixture of binder material, fuel source, and water through a die to form pellets of the fuel source. In certain embodiments, the mixture is placed in a feed hopper attached to a pellet mill and pelletized on a mid-compression die with a pellet exit heat in the range of about 70° C. to about 90° C. In some embodiments, the binder material melts to form, or continues to be, a flowing binder material during the physical processing of the mixture. In some embodiments, the binder material is allowed to cool and reform as a solid after the physically processing, coating and protecting the fuel source. In some embodiments, the coating of the binder material provides water-resistant and durable high-energy pellets of the fuel source.

In certain embodiments, the method of forming pellets comprises heating a binder material from birch bark sufficient to form a flowing binder material; mixing the flowing binder material with torrefied wood and water to form a mixture with a moisture content of about 10%; and physically processing the mixture to form pellets of torrefied wood.

Figure 4:
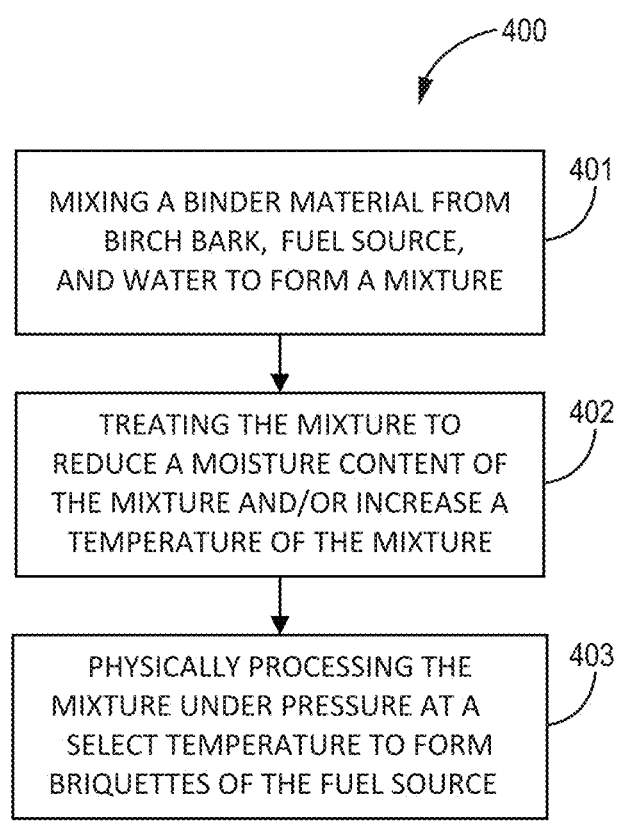
FIG. 4 is a flowchart of a method of forming briquettes of torrefied wood, according to one or more embodiments of the present disclosure.

In certain embodiments, the methods described above are used to form briquettes of the fuel source, or a briquetted fuel source. FIG. 4 is a flowchart of a method of forming briquettes of a fuel source, according to one or more embodiments of the present disclosure. As shown in FIG. 4, the method may comprise mixing 401 a binder material form birch bark, fuel source, and water to form a mixture, treating 402 the mixture to reduce a moisture content of the mixture and/or to increase a temperature of the mixture, and physically processing 403 the mixture under pressure at a select temperature to form briquettes of the fuel source.

The step of 401 includes mixing a binder material from birch bark, fuel source, and water to form a mixture. In some embodiments, water is mixed with the binder material and fuel source to provide a mixture with a desired moisture content. In some embodiments, the amount of water added to the binder material and torrefied wood includes an amount sufficient to provide a mixture with a moisture content in the range of about 5% to about 25%. In some embodiments, the moisture content of the mixture is about 20% (e.g., on a wet basis). In some embodiments, the mixture includes about 2% to about 20% binder material, and about 80% to about 98% fuel source. In some embodiments, the mixture includes about 10% binder material and about 90% fuel source.

The step of 402 includes treating the mixture to reduce a moisture content of the mixture and/or increase a temperature of the mixture. In some embodiments, the treatment includes heating. For example, in some embodiments, the treating includes heating using a microwave. In some embodiments, the treating includes heating using an oven. In some embodiments, the treating is sufficient to reduce a moisture content of the mixture to less than about 15%. For example, in some embodiments, the moisture content of the mixture is reduced to about 8% to about 12%. In some embodiments, either in addition or in the alternative, the treating is sufficient to increase a temperature of the mixture. For example, in some embodiments, the treating increases a temperature of the mixture to at least about 50° C. In some embodiments, the treating increases a temperature of the mixture in the range of about 70° C. to about 90° C.

The step of 403 includes physically processing the mixture under pressure at a select temperature to form briquettes of the fuel source. In some embodiments, the mixture is formed into briquettes under pressure and at temperatures suitable for a cold-pressed briquetting process or a hot-pressed briquetting process. For example, in some embodiments, the physical processing proceeds under a pressure of about 4200 psig or 14,793 psi. In some embodiments, the physically processing proceeds under conditions suitable for a cold-pressed briquetting process. For example, in some embodiments, the select temperature is less than about 35° C. In some embodiments, the select temperature is in the range of about 20° C. to about 22° C. In some embodiments, the physically processing proceeds under conditions suitable for a hot-pressed briquetting process. For example, in some embodiments, the select temperature is about 200° C. or greater. In some embodiments, the select temperature is about 260° C. In general, the physically processing proceeds for a duration sufficient to form the briquettes. For example, in some embodiments, the physically processing proceeds for a duration of about 30 s. In other embodiments, the duration of the physically processing is less than about 30 s and/or greater than about 30 s.

In some embodiments, the briquettes of the fuel source include about 2% to about 20% of binder material and about 80% to about 98% fuel source. In some embodiments, the briquettes of the fuel source include about 5% binder material and about 95% fuel source. In some embodiments, the briquettes of the fuel source include about 20% binder material and about 80% fuel source.

In certain embodiments, the method comprises mixing a binder material from birch bark, torrefied wood, and water to form a mixture with a moisture content of about 20%; treating the mixture to reduce a moisture content of the mixture to less than about 15%; and physically processing the treated mixture under pressure at a select temperature to form briquettes of torrefied wood.

The following Examples are intended to illustrate the above invention and should not be construed as to narrow its scope. One skilled in the art will readily recognize that the Examiners suggest many other ways in which the invention could be practiced. It should be understand that numerous variations and modifications may be made while remaining within the scope of the invention.

Example 1

Preparing Binder Material from Birch Bark

The Example describes procedures for producing high-energy water-resistant pellets having at least 90% torrefied wood and binder materials comprising from about 5% to about 20% by total weight of the pellets or briquettes. The starting materials included torrefied wood with a moisture content below about 15%, with the equilibrium water content being about 10% to about 15% water. The binder materials are green, bio-based materials for torrefied wood pelletizing and briquetting that were produced from abundant biomass waste materials.

The binder materials described herein alleviated the disadvantages of conventional torrefied wood pellets and briquettes, which suffer from poor water repellency and are not durable, among other things. The binder materials described herein were suitable for forming energy pellets or briquettes. In particular, the binder materials melted and flowed under the extruder conditions of elevated temperature and/or pressure. As the pellets or briquettes moved from the extruder and cool, the binder material reformed as a solid, coating and protecting the smaller particles of torrefied wood, for example.

The binder materials described herein included a mixture of completely natural compounds extracted or obtained from birch bark (e.g., outer birch bark). A pathway for producing the binder materials includes extraction of outer birch bark with an organic solvent. Isolation of a fatty acids, sterols, and/or waxes mixture with nonpolar organic solvent, preferably hexane, and preparation of fatty acid salts and methyl esters (FAMEs) by base- or acid-catalyzed esterification.

The method utilized extraction with any organic solvent as a first step, and concentration of the reaction mixture under reduced pressure to obtain the crude extract, followed by washing with nonpolar organic solvent, preferably hexanes, to provide free fatty acids, sterols, and waxes mixture, which had a very low triterpenes concentration. The preparation of fatty acid salts and methyl esters (FAMEs) proceeded by base-catalyzed esterification as a second step. See FIG. 5, for example, which is a flowchart of a method of isolating and modifying outer birch bark honey, according to one or more embodiments of the present disclosure.

For solid-liquid extraction, outer birch bark was washed with an organic solvent, preferably 2-propanol, in a proportion of bark/organic solvent between about 1/4 to about 1/10 by weight/volume and a temperature between about 60° C. and about 83° C. Where 2-propanol was used, extraction proceeded for a period between about 1 to about 4 hours. The next step included clarification by filtration of the extract and subsequently the clarified was concentrated by vacuum evaporation of the solvent (T<60° C.) to obtain a first crude extract with a volume between about 20% to about 30% of the volume of the initial mash.

The first crude extract obtained was fractioned by crystallization with organic solvent, preferably 2-propanol, in a proportion of first crude extract/organic solvent between about 1/5 to about 1/15 by weight/volume and then filtration of crystals (Betulin, Betulinic acid and Lupeol triterpenes mixture). Vacuum evaporation of the solvent (T<60° C.) was used to obtain a second crude extract with a volume of between about 20% to about 35% of the volume of the first crude extract.

The second crude extract obtained was washed with nonpolar organic solvent, preferably hexanes, in a proportion of second crude extract/organic solvent between about 1/6 to about 1/15 by weight/volume and a temperature between about 50° C. to about 68° C. Where the solvent was hexane, extraction proceeded for a period between about 1 to about 2 hours. The next step included clarification by filtration of the extract (T<35° C.), and subsequently the clarified was concentrated by vacuum evaporation of the solvent (T<60° C.) to obtain a third yellowish color extract, which is referred to as "birch honey," with a volume of between about 20% to about 30% of the volume of second crude extract.

Modification of yellowish birch "honey" included alkali hydrolysis, preferably NaOH, in a polar organic solvent, preferably methanol, for about 1 hour at temperature between about 50° C. to about 90° C. After solvent evaporation, concentrated solids were washed (e.g., a few times) with hot water in a proportion of solids/hot water between about 1/4 to about 1/10 by weight/volume. Water parts were decanted, and remaining solids were dried at a temperature between about 120° C. to about 140° C. for time period between about 4 to about 8 hours. Obtained dark brown color substance was viscous at a temperature above about 60° C. and solid and brittle at room temperature. These solids may be easily grinded to provide final binder material.

Test Procedures and Materials

Physical properties of the torrefied pellets and briquettes were determined with regard to mechanical durability. Climate tests included moisture resistance and rain exposure performed under laboratory conditions. Standard test procedures were used when available. The mechanical durability of a densified fuel provided an indication of the fuel's ability to retain its form during transport and handling processes without going to pieces. Durability was measured according to existing standards (EN 15210-1) applicable for fuel pellets. The durability value provided the mass proportion of the sample that remained intact after the removal of fine broken pieces (fines which passed through a 3.15 mm sieve). For conventional wood pellets, the minimum normative durability classification is equal to or greater than 97.5%.

To assess the outdoor storage properties of the torrefied wood pellets, rain exposure and water immersion tests were conducted on pellet samples. The rain exposure text was performed as follows: a 1 kg sample of pellets was placed on a 450 mm diameter Retsch 3.15 mm sieve. This amount was sufficient to cover the entire bottom of the sieve with one layer of pellets. The sieve was placed over a container. Simulated rainfall was realized through the use of a spray bottle fitted with fine nozzles. In total, 400 g of water was sprayed over each sample for a one-hour period. Runoff water from the pellets drained through the sieve and was collected in the container beneath. The mass of water not absorbed by the pellets could then be determined. The total amount of water corresponds to rainfall of 2.5 mm per hour—a level of rainfall which statistically occurs in Finland once every decade. This level of rain was predefined beforehand by experimentation. The pellets were also subjected to a water immersion test. A 500 g sample of each pellet type was placed in a filtration bag which was then submerged for a period of 15 minutes in a five-liter container of water. By weighing the quantity of water after the immersion period, the amount of water absorbed by the pellet sample could be identified. The immersion time was fixed by pretesting.

Example 2

Figure 5:
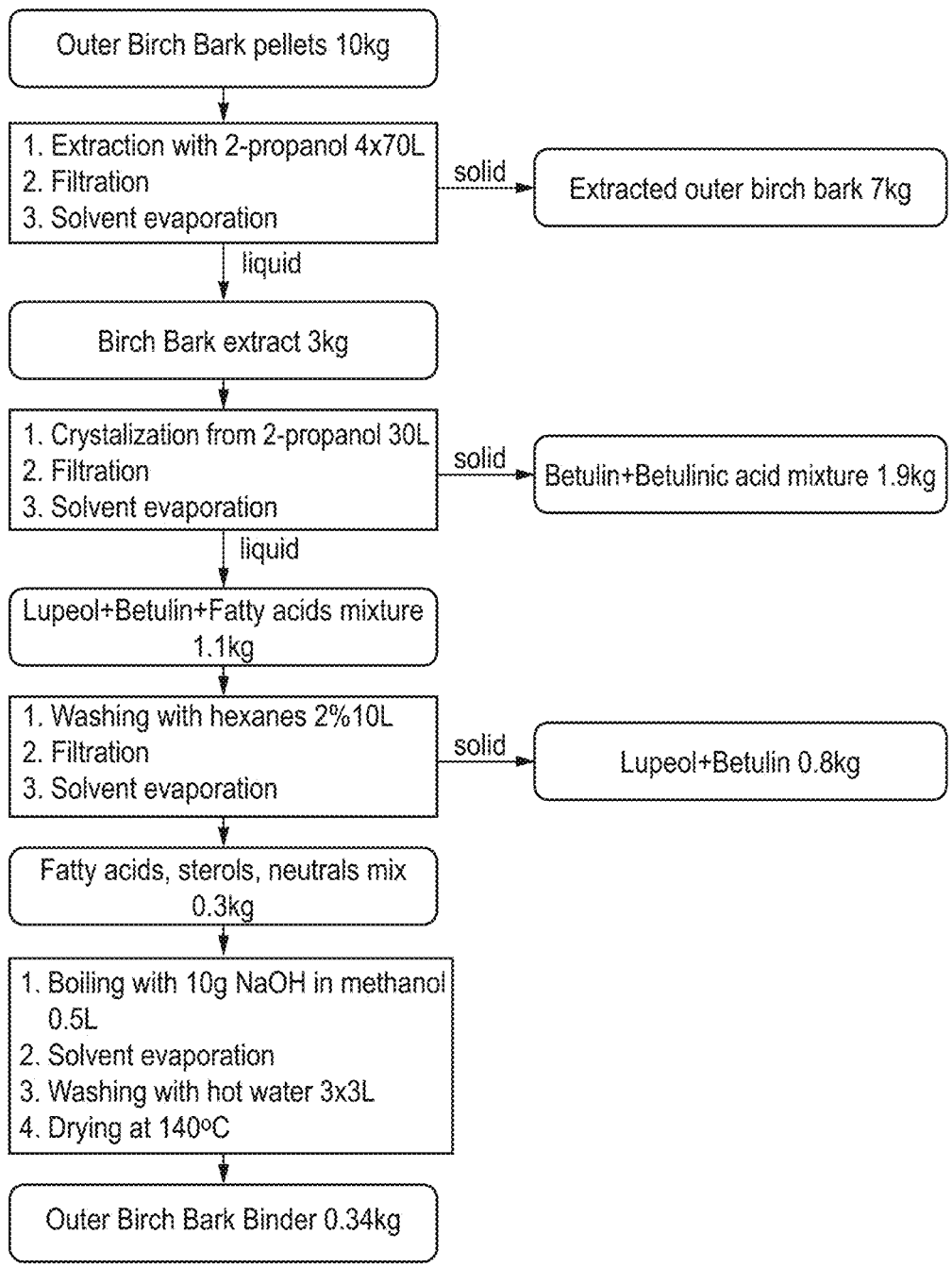
FIG. 5 is a flowchart of a method of isolating and modifying outer birch bark honey, according to one or more embodiments of the present disclosure.
Figure 6:
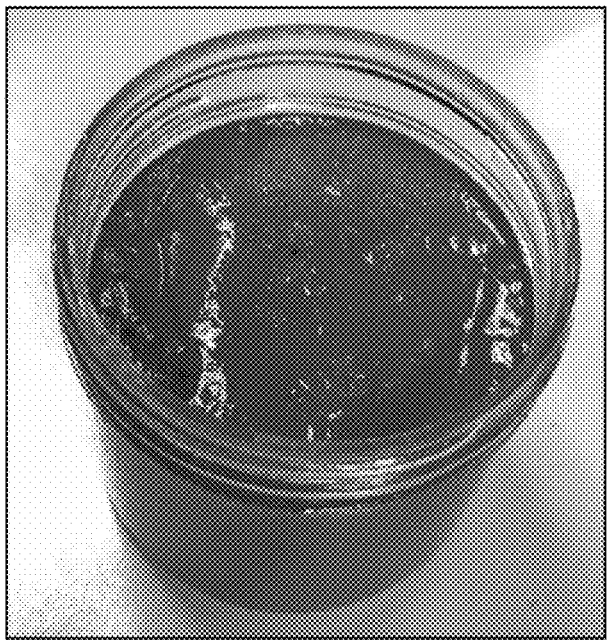
FIG. 6 is an image of outer birch bark "honey," according to one or more embodiments of the present disclosure.
Figure 7:
FIG. 7 is an image of modified outer birch bark "honey," according to one or more embodiments of the present disclosure.
Figure 8:
FIG. 8 is an image of modified outer birch bark "honey," according to one or more embodiments of the present disclosure.
Figure 9:
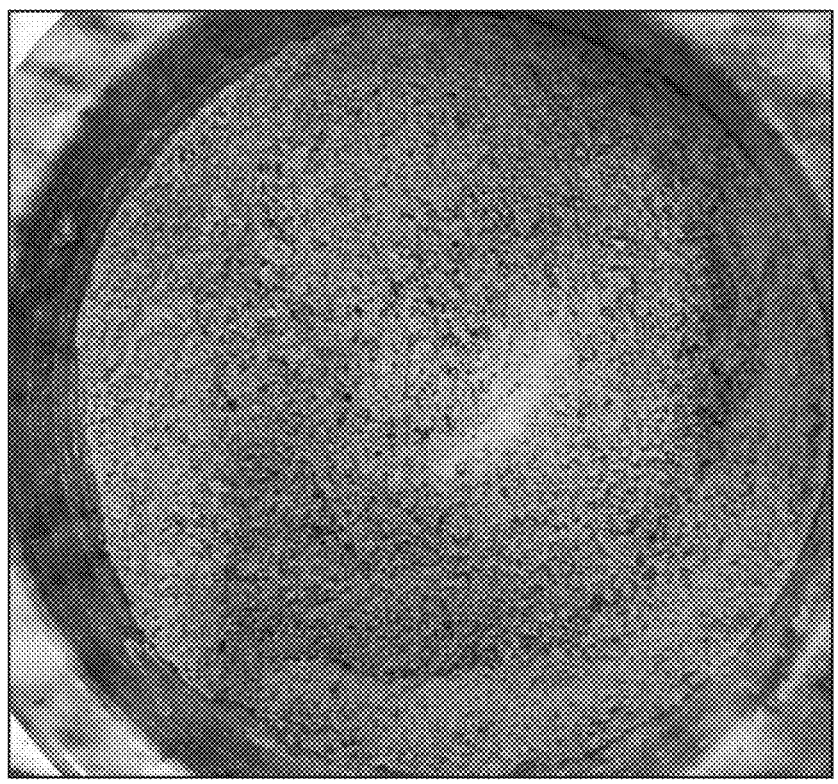
FIG. 9 is an image of modified outer birch bark "honey," according to one or more embodiments of the present disclosure.
Figure 10:
FIG. 10 is an image of modified outer birch bark "honey," according to one or more embodiments of the present disclosure.

Preparation of Binder Material from Outer Birch Bark 10 kg of birch bark was extracted with 2-propanol (4×70 L). After solvent evaporation, 3 kg of birch bark extract was obtained. After birch bark extract recrystallization from 2-propanol (30 L), solids were filtered off to provide a triterpenes mixture (Betulin, Lupeol, Betulinic acid are major compounds). All liquid parts were combined, and solvent was evaporated to produce a 1.1 kg yellowish solids. These yellowish solids were washed with hot hexanes (2×10 L), cooled down and filtered off. After solvent evaporation, free fatty acids, sterols and waxes part of the yellow waxy birch "honey" substance (300 g) were obtained (FIGS. 5-6).

Birch Bark "Honey" (300 g) was boiled for 1 hour with 10 g NaOH in methanol (0.5 L) and cooled down. After solvent evaporation, solids were repeatedly washed with boiling water solution and decanted. The obtained viscous material was dried at about 140° C. for 5 hours and cooled down. The obtained material (305 g) was solid at room temperature and was easily grinded to a powder. At 60° C. and above, material had a viscous texture (FIGS. 7-10).

Example 3

Forming Pellets 50 grams of the binder and 450 grams of dry NBE torrefied wood with ratio of about 10% binder to about 90% dry torrefied wood. Sufficient amount of water was added to torrefied wood so that total mix before pelletizing (binder, torrefied wood, and moisture) had a moisture content of about 10% (on a wet basis). Binder was placed on a hot plate until the material lost viscosity and can be poured in with torrefied wood. Binder was poured in with the torrefied wood and water mixture and immediately mixed in the Hobart machine for 2 minutes on the High setting. Mixture was placed in the feed hopper attached to the pellet mill, and pelletized on a mid-compression die with a pellet exit heat of around 70-90° C.

Figure 11:
FIG. 11 is an image of pellets produced with about 10% binder and about 90% dry torrefied wood, according to one or more embodiments of the present disclosure.

The composition of pellets included about 95% torrefied wood and about 5% binder; and about 80% torrefied wood and about 20% binder. The optimal specific ratios of binder included about 2% to about 5% and up to about 20% of binder, with the remaining balance torrefied wood. See FIG. 11, which is an image of pellets produced with about 10% binder and about 90% dry torrefied wood, according to one or more embodiments of the present disclosure.

Example 4

Forming Briquettes Via a Hot-Pressed Procedure

Sufficient amount of water was added to a mixture of about 20% binder and about 80% torrefied wood to get about 20% moisture (wet basis), and all mixed for about 5 minutes. About 40 grams of mix was placed into a microwave until the moisture lowered to roughly 8-12% and the material was roughly 70-90° C. Mix was placed into a hot 260° C. (flat briquettes), and compressed at about 4200 psig or 14,793 psi sample for about 30 seconds. See Table 1. All samples in Table 1 were premixed in a ratio of about 20% of binder and about 80% of syngas steam stripped torrefied black ash.

TABLE 1

| Sample | Cold Pressed Pucks | | Hot Pressed Pucks | |
|---|---|---|---|---|
| | Total MPI (min) | Durability (%) | Total MPI (min) | Durability (%) |
| Cranberry omega hydroxy fatty acids, sterols and waxes mix (phloionolic acid 75%) | 345 | 99.1 | 360 | 93 |
| Outer Birch Bark "honey" | 93 | 98 | 43 | 48 |
| Modified Outer Birch Bark "honey" | 75 | 96 | 310 | 97.5 |
| Outer Birch Bark omega hydroxy fatty acids mix (phloionolic acid 75%) | 0 | 97.3 | | |
| Phloionolic acid | 0 | 99.7 | | |
| Palmitic acid | 360 | 28.3 | | |
| No binder | 0 | 75.2 | | |

Example 5

Forming Briquettes Via a Cold-Pressed Procedure

Sufficient amount of water was added to a mixture of about 20% binder and about 80% torrefied wood to get about 20% moisture (wet basis), and all mixed for about 5 minutes. About 40 grams of mix was placed into a microwave until the moisture lowered to roughly 8-12% and the material was roughly 70-90° C. Mix was placed into a cold 20-22° C. (flat briquettes), and compressed at about 4200 psig or 14,793 psi sample for about 30 seconds. See Table 1, above.

The composition of briquettes included about 95% torrefied wood and about 5% binder; and about 80% torrefied wood and about 20% binder. The optimal specific ratios of binder included about 2% to about 5% and up to about 20% of binder, with the remaining balance torrefied wood.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto Various examples have been described. These and other examples are within the scope of the following claims.

What is claimed is:

1. A method of making a binder material from birch bark, comprising:
   contacting birch bark with an organic liquid solvent to obtain a first extract, wherein the first extract includes at least fatty acids and triterpenes;
   separating at least a portion of the triterpenes from the first extract to obtain a second extract with a reduced concentration of triterpenes;
   contacting the second extract with a nonpolar solvent to obtain a third extract; and
   contacting the third extract with an alcohol alkali solution to obtain a binder material via alkali hydrolysis, wherein the binder material includes one or more of fatty acids, fatty acids salts, fatty acids esters, sterols, and waxes.

2. The method of claim 1, wherein the birch bark is bark from B. alba; B. lenta; B. maximowicziana; B. nana; B. platyphyla Japonica; B. pubescens; B. alleghaniensis; B. papyrifera; B. populifolia; B. nigra; and B. pendula.

3. The method of claim 1, wherein separating includes crystallizing the triterpenes in the first extract using 2-propanol and subsequently filtering the crystals from the first extract.

4. The method of claim 1, wherein the triterpenes include betulin, betulinic acid, and lupeol.

5. The method of claim 1, wherein the reduced concentration of triterpenes is about 15% or less.

6. The method of claim 1, wherein the nonpolar solvent is hexane.

7. The method of claim 1, wherein the alcohol alkali solution includes NaOH, methanol, and water.

8. The method of claim 1, wherein the binder material is free or substantially free of lignin.

* * * * *